Figure 3:
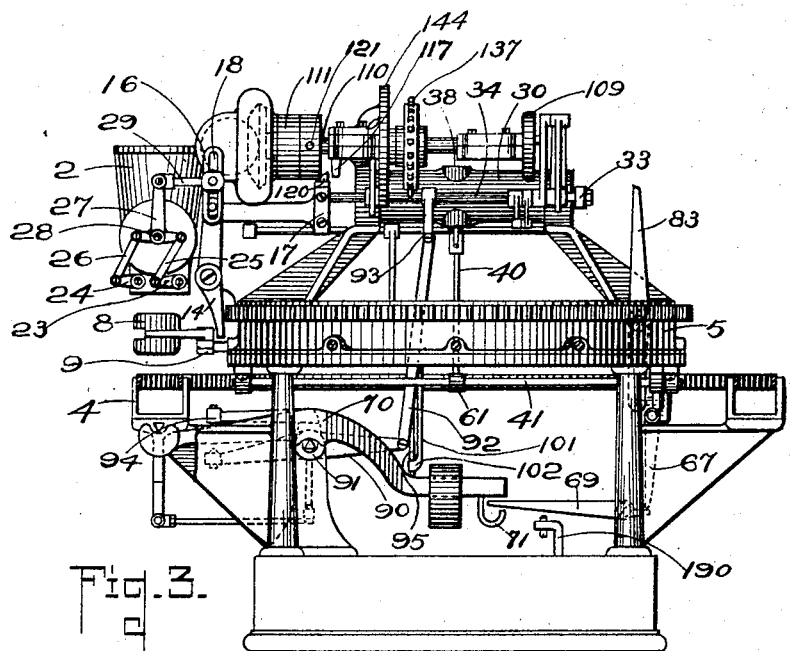

No. 720,008. PATENTED FEB. 10, 1903.
W. H. DOBLE.
WEIGHING OR PACKAGING MACHINE.
APPLICATION FILED FEB. 13, 1902.
NO MODEL. 10 SHEETS—SHEET 1.
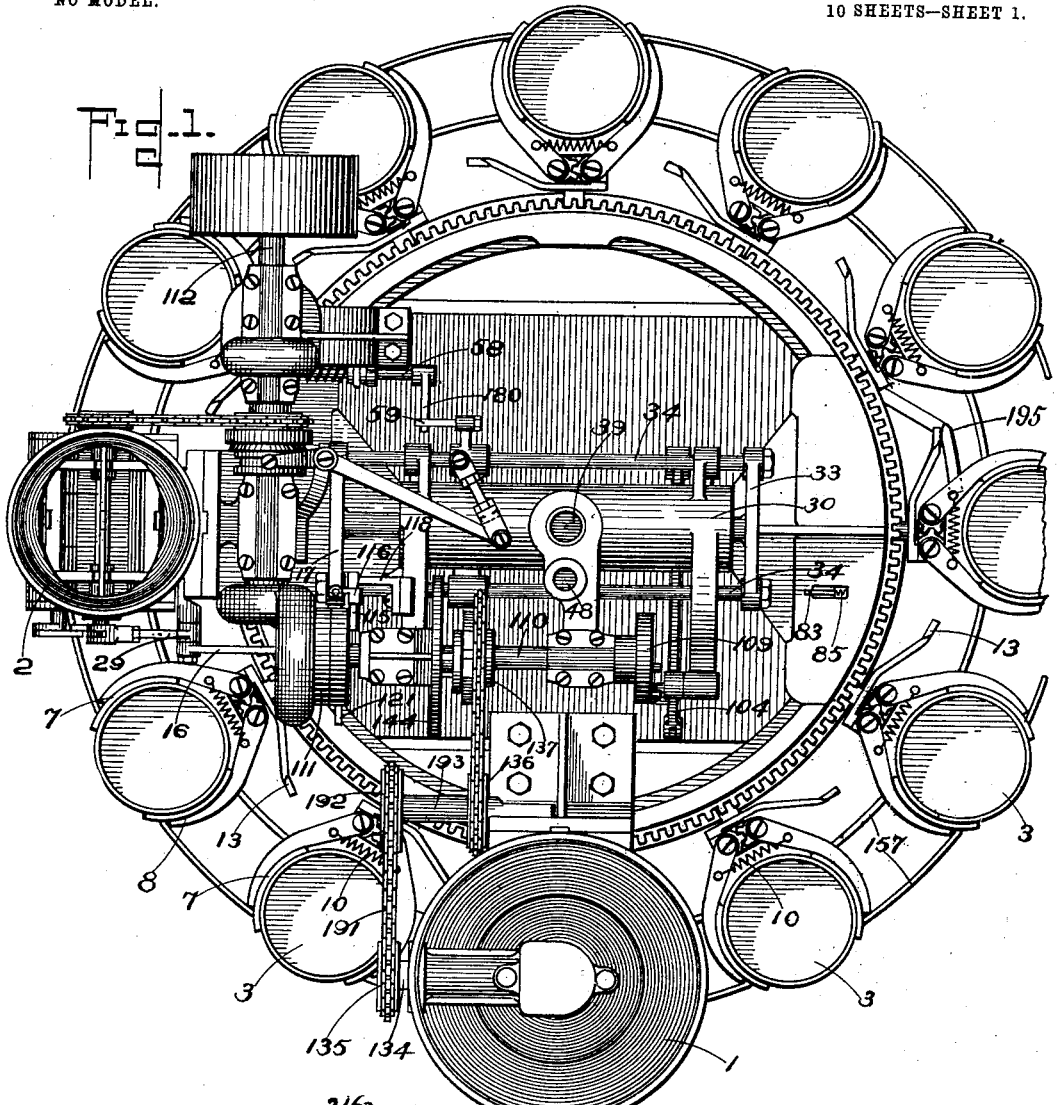
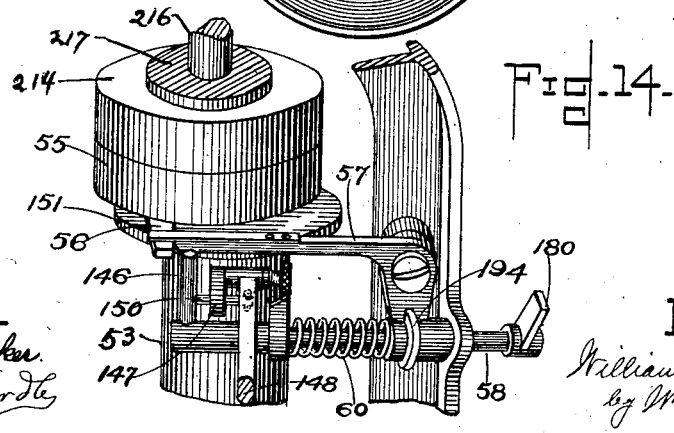

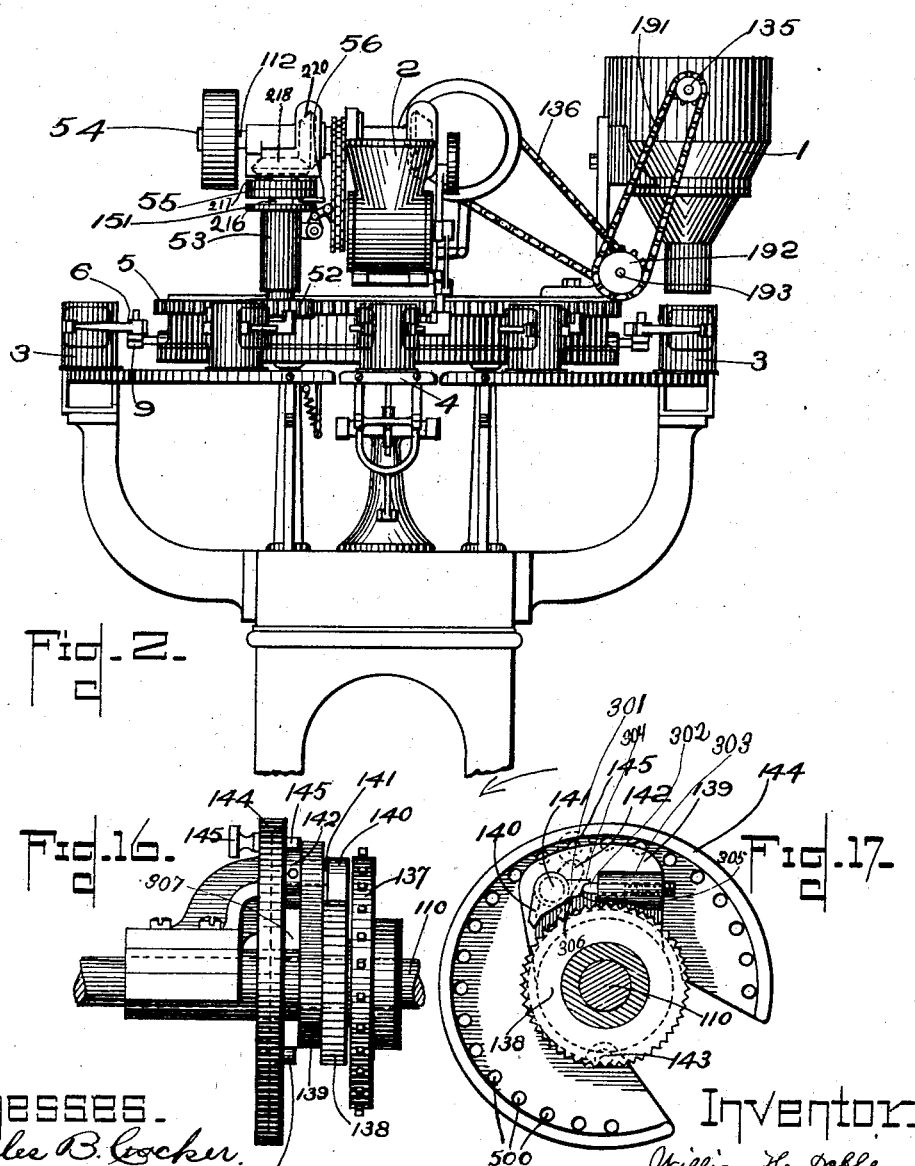

No. 720,008. PATENTED FEB. 10, 1903.
W. H. DOBLE.
WEIGHING OR PACKAGING MACHINE.
APPLICATION FILED FEB. 13, 1902.
NO MODEL. 10 SHEETS—SHEET 3.

Witnesses. Inventor:
Charles B. Crocker. William H. Doble
Fred W. McCrody. by Wm A. Capelau
 Atty.

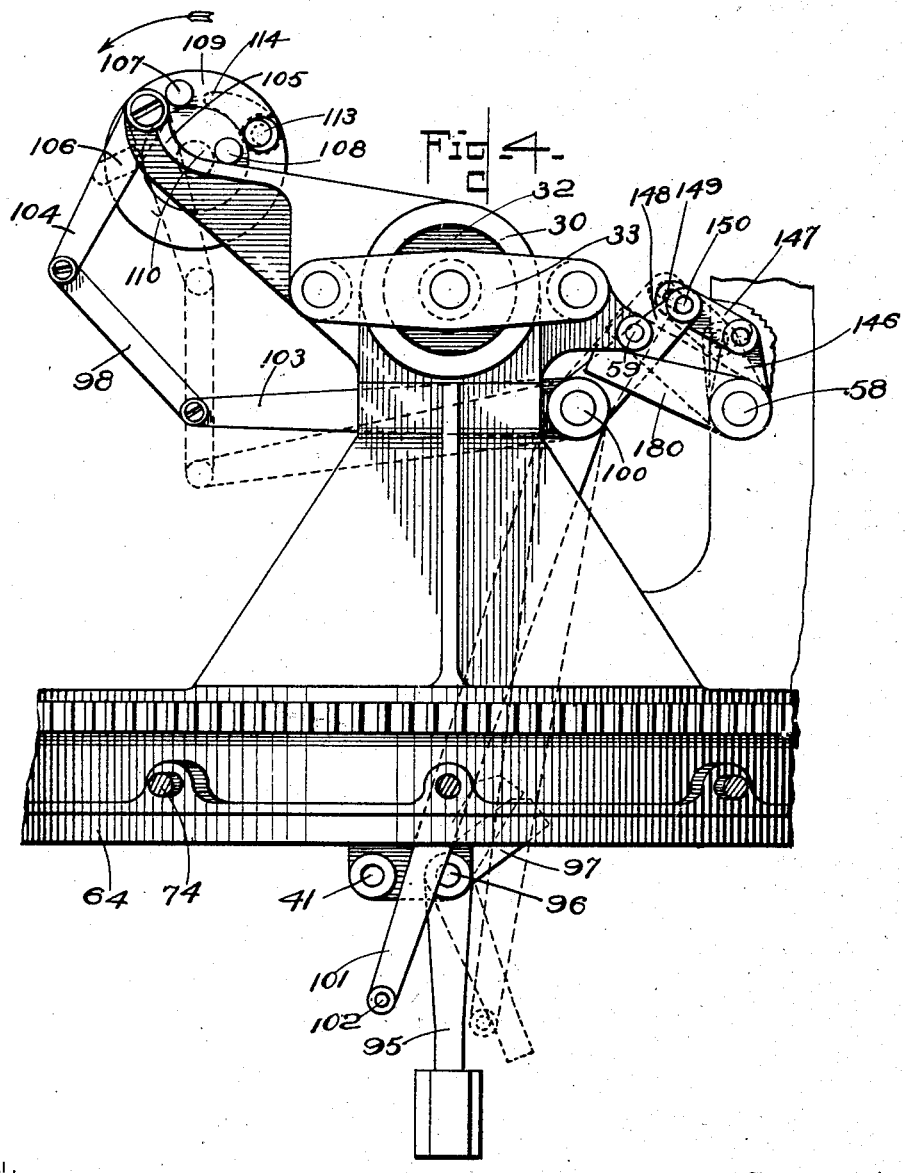

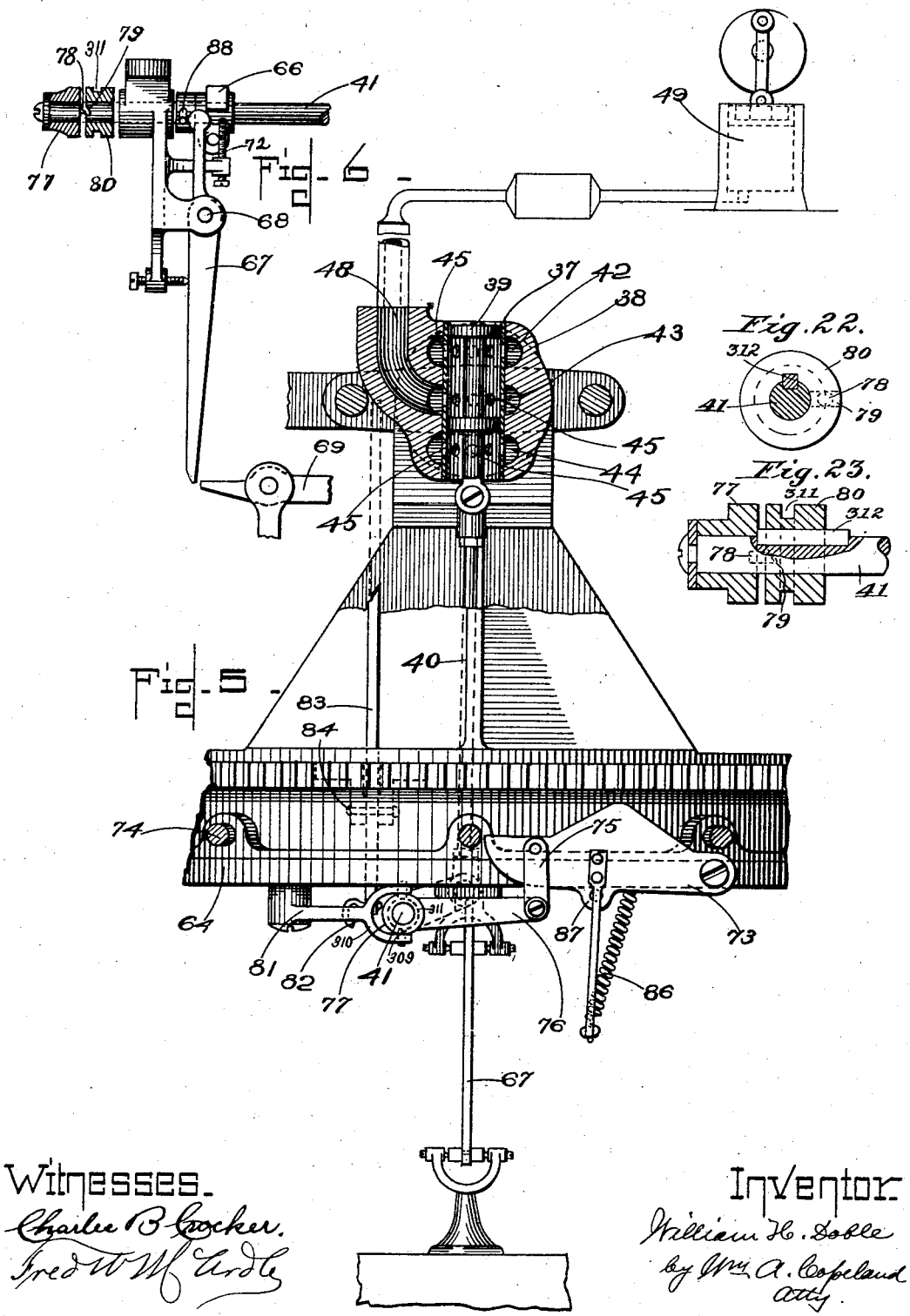

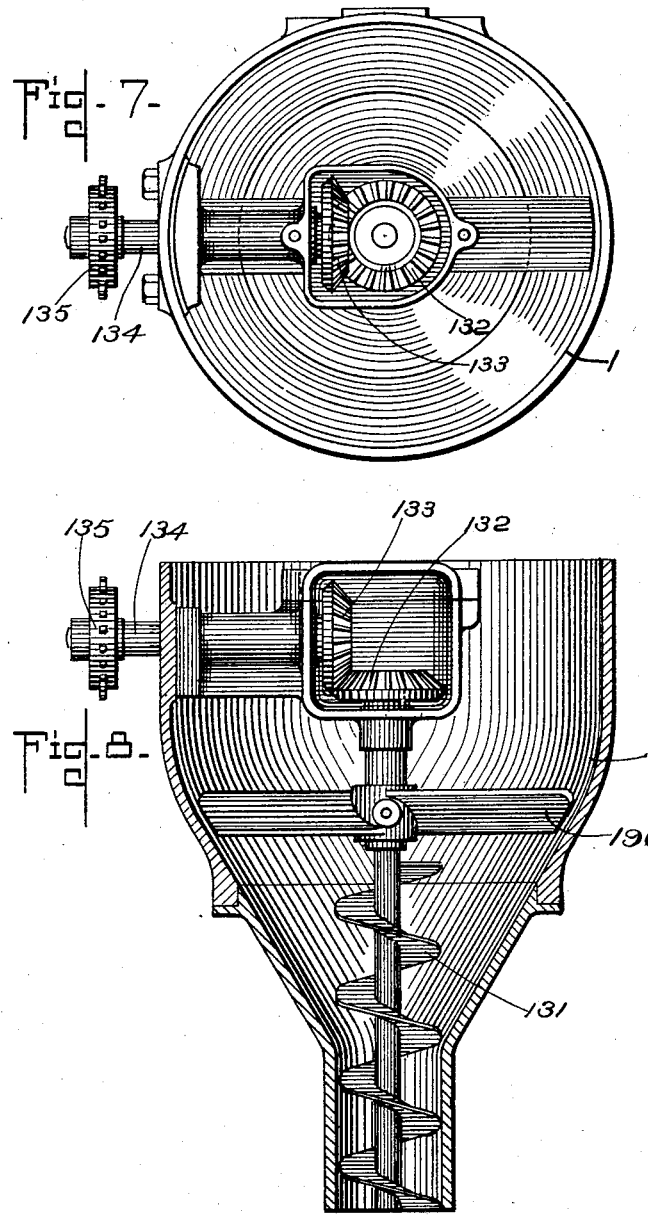

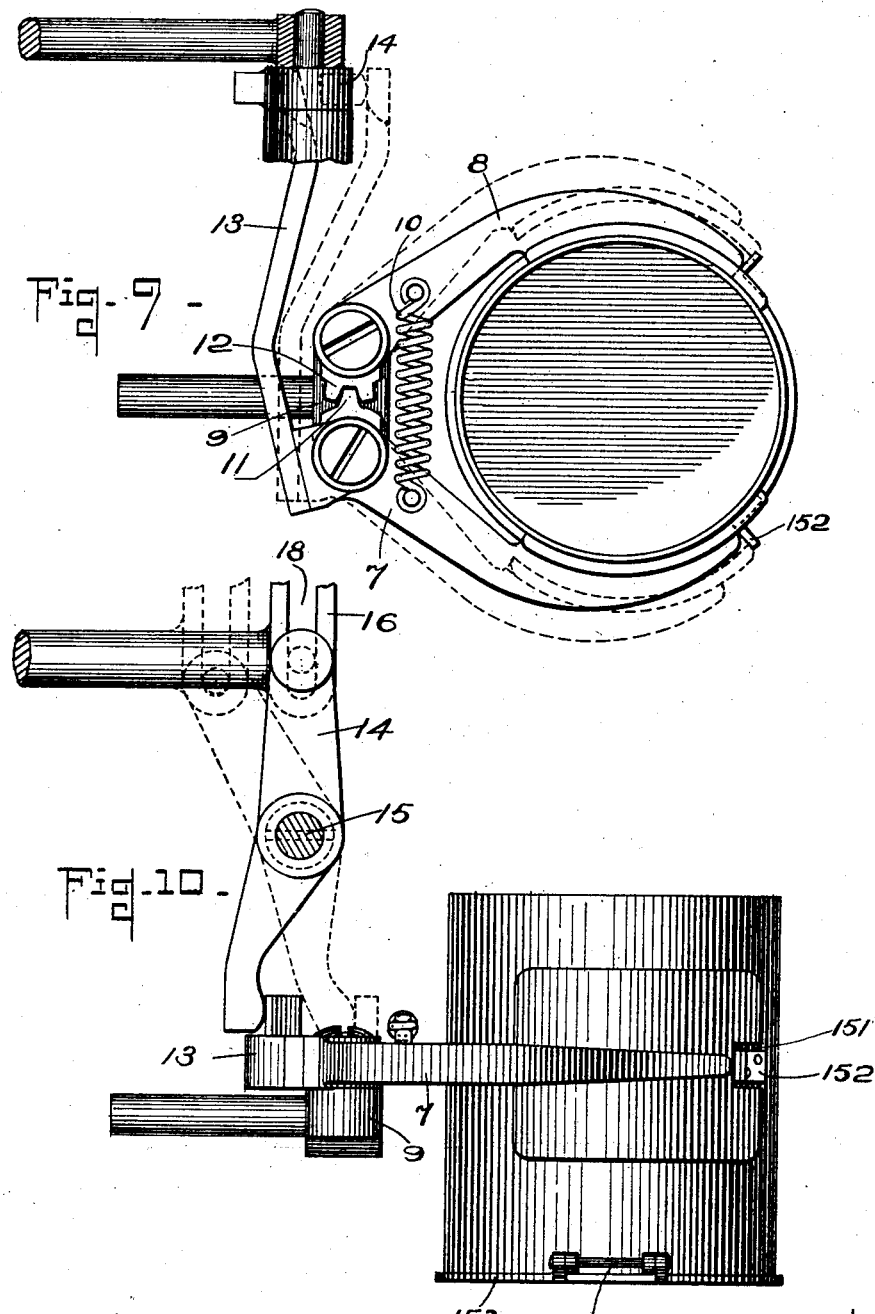

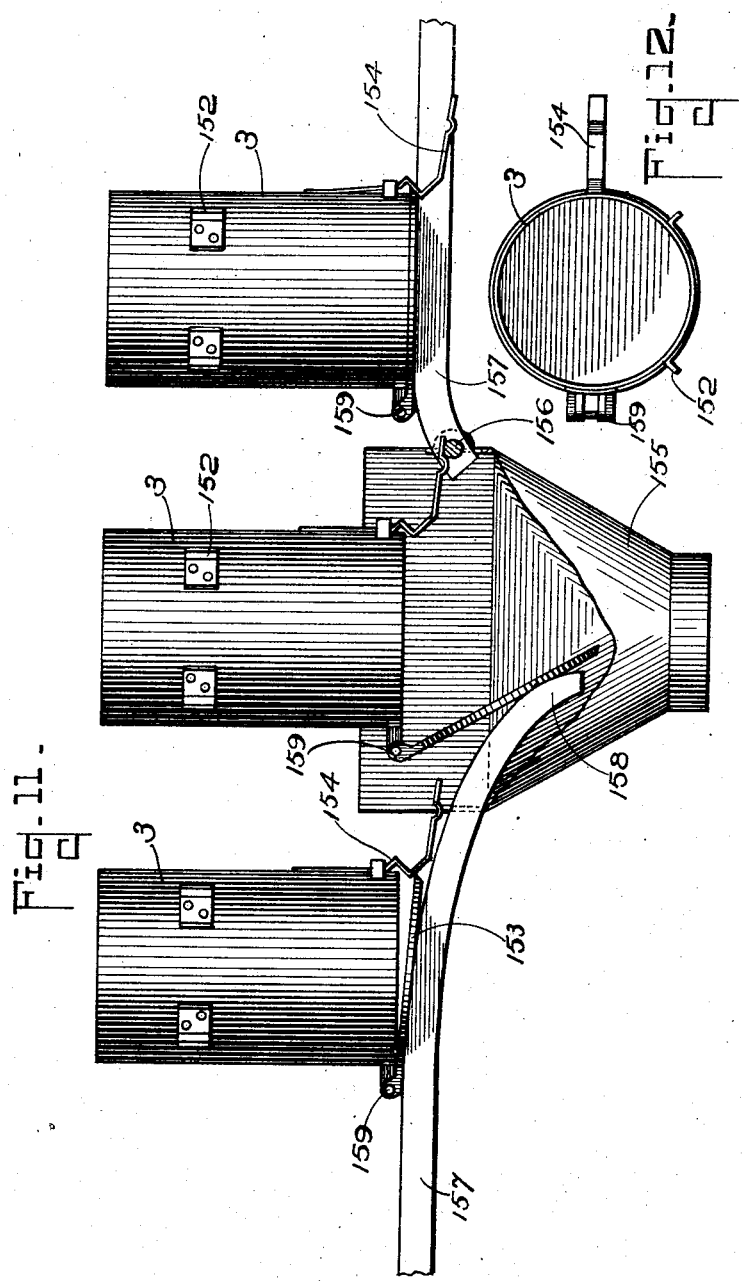

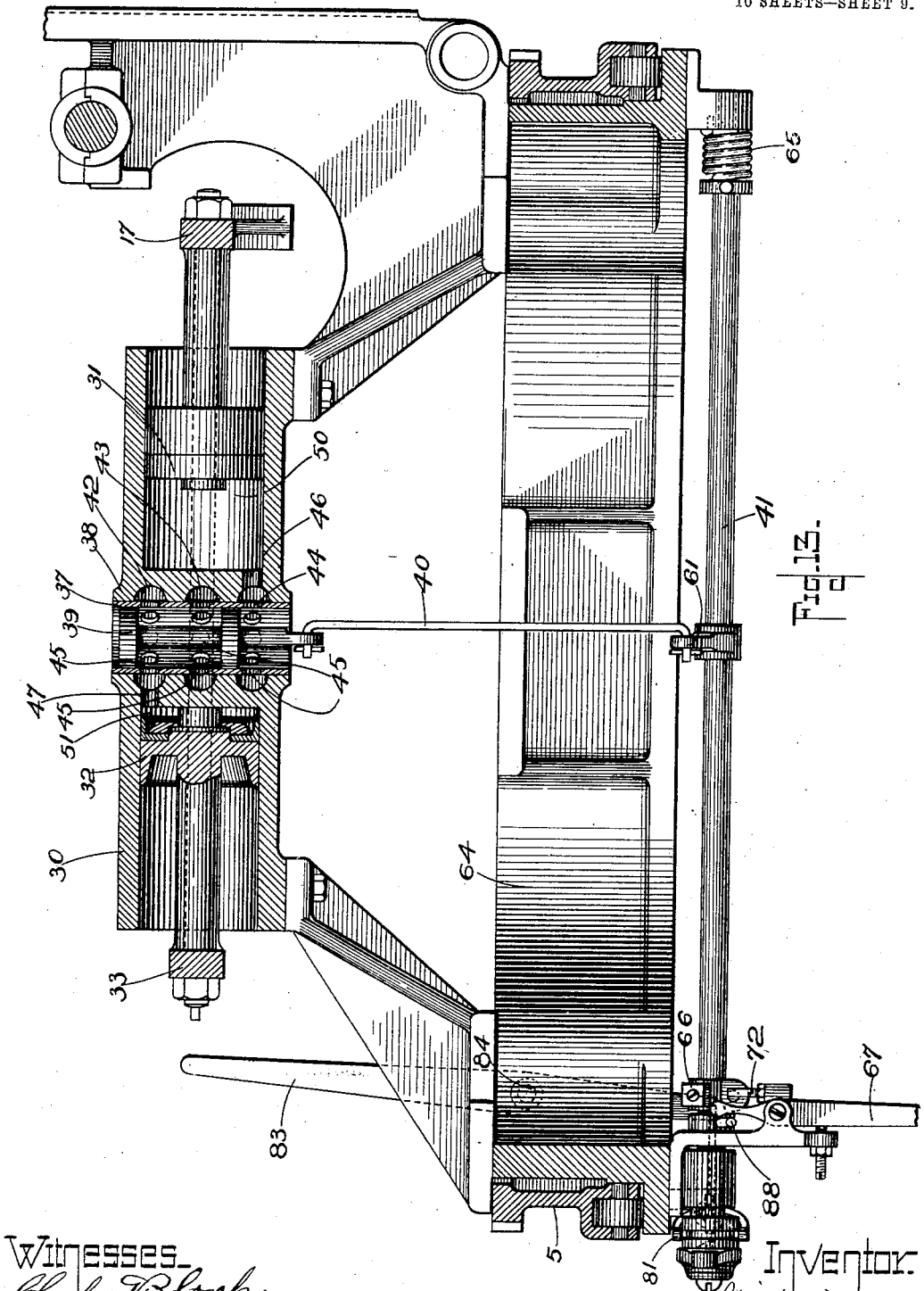

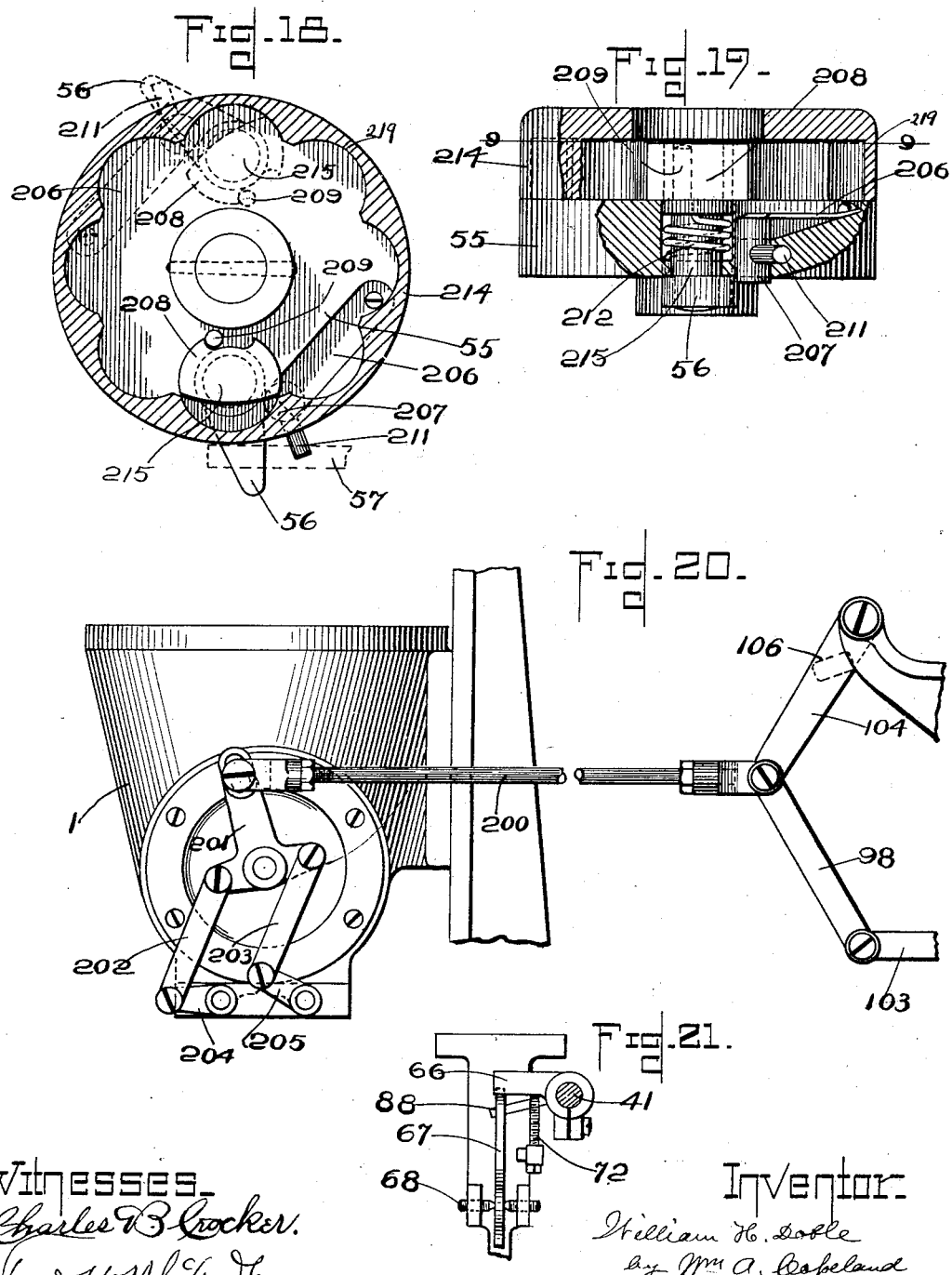

UNITED STATES PATENT OFFICE.

WILLIAM HENRY DOBLE, OF QUINCY, MASSACHUSETTS, ASSIGNOR TO PNEUMATIC SCALE CORPORATION, OF PORTLAND, MAINE, A CORPORATION OF MAINE.

WEIGHING OR PACKAGING MACHINE.

SPECIFICATION forming part of Letters Patent No. 720,008, dated February 10, 1903.

Application filed February 13, 1902. Serial No. 93,886. (No model.)

*To all whom it may concern:*

Be it known that I, WILLIAM HENRY DOBLE, a citizen of the United States, and a resident of Quincy, in the county of Norfolk and State of Massachusetts, have invented certain new and useful Improvements in Weighing or Packaging Machines, of which the following is a specification.

The invention is especially intended for use in what is termed a "double-hopper" or "double-feed" weighing-machine—that is, one in which the receptacles in which the goods are weighed receive a portion of the desired load first through one feeder and are then transferred to the weigher, where they receive the remainder of the desired load, one feeder delivering goods to the receptacle on the weigher at the same time that the first feeder is delivering the preliminary supply to another receptacle. Some of the features of the invention are adapted, however, to use in a single-feed machine as well as in a double-feed machine, and the claims so far as applicable to other kinds are not intended to be limited solely to either class of machines.

One feature of the invention relates to means by which a uniform net weight of goods is successively fed into a series of receptacles which automatically discharge their contents into packages and again present themselves for another load, one receptacle being discharged while another is being filled.

Another feature relates to means for more firmly holding the receptacle while being discharged. The tripping of the scale sets in motion mechanism which removes from the scale the receptacle which is already on the scale and brings another receptacle to the scale. When the new receptacle is on the scale, the feed-valve is opened. It is important that the feed-valve should not be opened until the carrier has come to a state of rest after delivering a receptacle onto the scale. One feature of the invention relates to means by which this result is effected.

Another feature of the invention relates to means by which the scale is kept locked until after the receptacle in which the goods are weighed is on the scale and begins to receive goods and is then unlocked, the scale being again locked after it has tipped. If the scale were not locked at the time the receptacle is delivered onto it, it would be given more or less vibration, which might cause the scale to be tipped before the full weight of goods is delivered onto the receptacle.

Another feature of the invention relates to means whereby if the receptacle on the scale shall have received its full complement and the scale tipped before the delivery of the preliminary partial load to another receptacle is completed the carrier will be prevented from starting until the preliminary supply is cut off. Also if an abnormal weight of goods is delivered to the receptacle through the preliminary supply it will cause the machine to stop when the abnormally-loaded receptacle reaches the scale.

Another feature of the invention relates to the use of an intermittently-actuated worm-feed for supplying a partial load to the receptacle while another receptacle is receiving the completion of its load and means by which the worm is caused to cease feeding before the receptacle is removed.

There are other features of the invention, which will be hereinafter mentioned.

The invention will now be fully described, and the several novel features will be particularly pointed out in the claims at the close of the specification.

The machine illustrated in the drawings as embodying the invention is a double-feed machine.

Figure 16:
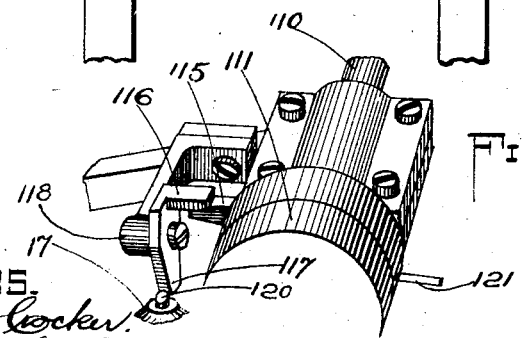

Figure 1 is a plan of a machine embodying the invention. Fig. 2 is a front elevation. Fig. 3 is a side elevation viewed from the right hand of Fig. 1, the first hopper being removed to more clearly show some of the parts. Fig. 4 is a rear elevation showing in detail the mechanism for locking and unlocking the scale. Fig. 5 is a rear elevation, partly in section, showing the mechanism for opening the scale-feed. Fig. 6 is a detail of the latch which is tripped by the scale-beam at the completion of its load. Fig. 7 is a plan of the worm-feed. Fig. 8 is a vertical section of Fig. 7. Fig. 9 is a detail plan of one of the receptacles or buckets and the means for holding it to the carrier. Fig. 10 is a side elevation of Fig. 9. Fig. 11 is a rear elevation showing in detail the means for discharging the receptacles. Fig. 12 is a plan of one of the receptacles. Fig. 13 is an elevation, partly in section, viewed from the left in Fig. 1, showing the piston and valves and connections in the position they occupy at the instant that the valve is shifted to its upper position. Fig. 14 is a detail of the clutch which connects with the driving mechanism and the safety locking device. Fig. 15 is a detail of the clutch which controls the operation of the feed through the first hopper. Figs. 16 and 17 are details of the timing mechanism connected with the feed to the first hopper. Figs. 18 and 19 are sectional views of clutch 55. Fig. 20 is a detail showing a modified form of mechanism for opening and closing the feed of the first hopper. Fig. 21 is a detail of the stop-lever and tripping-lever connected with the piston-actuating rocker-shaft 41. Figs. 22 and 23 are enlarged sectional views showing disks 77 and 80 and the feather connection of disk 80 with the shaft 41.

An endless traveler, preferably a horizontally-rotating carrier, is provided with a series of receptacles or buckets of uniform and known weight, each of which is carried in turn first to a position where it receives a portion of its load from one supply, then to the scale, where it receives enough additional goods to make up the required weight, the scale being poised to the combined weight of the receptacles and desired weight of the goods, the receptacle being discharged of its load at some point after it leaves the scale and then again brought into position to receive another load, the carrier being intermittently moved after each completed load to bring receptacles into position for simultaneously partially loading, completion of load, and discharging, respectively. When the partially-filled receptacle is deposited upon the scale to receive the complement of its load, the clamps which hold it to the carrier are released, and after the load is completed the clamps again grip the receptacle and retain their grip until the receptacle is in turn discharged and again deposited on the scale for a new load.

The goods are restrained from feeding during the movement of the carrier and until after a receptacle is deposited on the scale. When the scale tips, mechanism is actuated which stops the feed to the receptacle on the scale, the scale is restored to its normal position and locked, and the carrier moves through an interval to remove the loaded receptacle from the scale.

The movement of the carrier actuates mechanism which applies an auxiliary or safety lock to the scale. The primary lock is released by the mechanism which opens the feed to the receptacle on the scale as soon as the feed is opened. The mechanism which opens the feed also actuates other mechanism which is timed to release the auxiliary lock at a short interval after the primary lock is released.

The mechanism which opens the valve which controls the supply to the receptacle on the scale actuates mechanism which opens or starts the preliminary feed to partially fill another receptacle, the preliminary feed being continued for a predetermined period, which should be less than the time required to complete the load on the scale.

The mechanism which stops the preliminary feed releases the auxiliary or safety lock from the scale.

The mechanism which closes the valve which controls the supply to the receptacle on the scale starts in operation the mechanism which moves the carrier, provided the mechanism is in proper position. The said mechanism is set in position by the movement of the mechanism which stops the preliminary feed. If therefore for any reason there is a full load on the scale before the closing of the preliminary feed, although the scale-feed will be cut off, yet the carrier cannot move until the preliminary feed is also stopped.

At a certain convenient point after the loaded receptacle or bucket is removed from the scale and is on its return-circuit it will be engaged by mechanism which will dump the load during one of the intervals when another receptacle is being filled.

The machine shown in the accompanying drawings as embodying the invention will now be fully described.

In the drawings, 1 is the hopper through which the goods are fed to partially fill the receptacles or buckets before reaching the scale, provided two hoppers are employed, and 2 is the second hopper through which goods are fed to the buckets 3 while on the scale 4 to complete the load. The term "hopper" as used in this specification is intended to include any suitable feed-chute, and "hopper-valve" is intended to include any suitable cut-off or feed-stop.

In the type of machine illustrated in the drawings the tipping of the scale actuates mechanism which shuts off the flow of goods to the bucket on the scale.

The feature of the invention which relates to the securing a net weight of goods preferably consists of an intermittently-moving carrier which carries a series of receptacles of uniform weight into which successively there is automatically fed a predetermined weight of goods, each loaded receptacle being automatically transferred from the scale and discharged and again loaded.

The buckets 3, which are all of an ascertained weight, are successively conveyed by an intermittently-moving carrier and deposited upon the scale 4 free from the carrier, and at the succeeding movement of the carrier after the bucket has received its requisite load the carrier takes the bucket and transfers it from the scale, giving way to the next following bucket.

In the form of machine illustrated, the bucket-carrier consists of bucket-clamps attached to an intermittently-moving ring 5, which is actuated by suitable mechanism to move at each interval through an arc sufficient to bring one of the buckets to the scale. Projecting from the ring 5 are the bucket-clamps 6. These clamps each consist of two fingers 7 8, pivoted to a bracket 9 on the ring 5 and which are normally held by the spring 10 in a clasping embrace of the buckets. (See especially Figs. 9 and 10.) When the bucket reaches the scale, the fingers should be entirely released from contact with the bucket so not to interfere with the accurate weighing, and one feature of the invention is to provide mechanism for accomplishing this.

The heel of finger 7 has a tooth 11, which engages with teeth 12 on the heel of finger 8, so that whenever one finger is moved on its pivot the other finger will have a corresponding opening or closing movement. Secured to the back of finger 7 is a lever 13, which when the bucket is under the scale-hopper or "drip-hopper," as it is sometimes called, and the valve is opened is engaged by the clamp-releasing lever 14, fulcrumed at 15, which pushes forward the lever 13, thereby spreading the fingers and overcoming the tension of spring 10 and releasing the bucket, so that it will stand free on the scale. This clamp-releasing lever 14 is actuated by the mechanism which opens and closes the valve of hopper 2, so that when the valve is opened after the bucket comes to its position above the scale the lower end of lever 14 will move forward and engage lever 13 to open the fingers 7 8, as above described. When the valve-actuating mechanism closes the valve after the scale has tipped, the lower end of lever 14 will be drawn backward and the spring 10 will cause the fingers to again clamp the bucket.

The device shown for moving the clamp-releasing lever 14 consists of a reciprocating angle-bar 16, connected with the cross-head 17 on the reciprocating frame which moves the hopper-valve. The angle-bar 16 reciprocates with said frame. The upper end of lever 14 is pivoted in a slot 18 in the vertical arm of the angle-bar. The angle-bar 16 is also connected by suitable means with the valve of hopper 2 to open and close the same. The valve shown is operated by lever-arms 23 24, connected by links 25 26 with the cross-arms of the T-lever 27, fulcrumed at 28, the tail end of said lever being connected by rod 29 with the angle-bar 16.

The movable carrier may be varied in form without departing from the invention. It is not intended to be limited to a rotating ring.

The feed-valve opening and closing mechanism for the scale-hopper may consist of any suitable means whereby the feed-valve is opened after the weighing-receptacle has reached the scale and which closes the feed-valve after the required load has been fed into the receptacle. The preferred form is a reciprocating member connected with the feed-valve and driven by any suitable power which is applied by mechanism actuated by the tipping of the scale to move the reciprocating member in a direction to close the valve and mechanism which applies the power to move the reciprocating member in the reverse direction and open the valve when a receptacle again reaches the scale.

One method of driving the reciprocating member is by means of a solenoid—such, for instance, as shown in United States Letters Patent No. 633,675 to George Watson, dated September 26, 1899. Another means is by compressed air, one form of mechanism for applying it being shown in the drawings and now to be described.

In one end of cylinder 30 is a piston 31, whose stem is connected with the cross-head 17, and in the other end of the cylinder is a piston 32, whose stem is connected with cross-head 33. The two cross-heads 17 and 33 are connected by rods 34, which are supported by and slide through brackets fixed to the side of the cylinder 30. A perforated tubular bushing 37 passes crosswise through an air-chest 38 in the cylinder 30 between the two pistons 31 and 32 and forms a casing for the piston-valve 39, which is connected by rod 40 and crank 61 with rocker-shaft 41. The air-chest 38 is cored out to form the ring air-chambers 42 43 44 around the outside of the valve-casing. Port-holes 45 lead from the said air-chambers into the valve-casing. A duct 46 leads from the lower ring-chamber 44 into the chamber 50 of the cylinder in which the piston 31 moves, and a duct 47 leads from the upper ring-chamber 42 into the cylinder-chamber 51 in which the piston 32 moves. When the piston-valve is at the end of its upward stroke, the upper disk of the valve is above the upper port and opens connection with the chamber of piston 32, and the lower disk is above the lower port, which then connects with the outside air. When the valve is at the end of its downward stroke, the upper disk is below the upper port and makes connection with the outside air and the lower disk is below the lower port, thereby closing its connection with the outside air and opening connection with the chamber of piston 31. The middle ring-chamber 43 is always closed to the outside air and is connected by tube 48 with a compressed-air chamber or pump 49. When rocker-shaft 41 rocks in a direction to raise the valve 39, the compressed air is discharged from piston-chamber 50 and compressed air is admitted to piston-chamber 51, forcing the piston 32 to the right in Fig. 3—that is, rearward—thereby opening the valve of hopper 2 and turning clamp-releasing lever 14 on its fulcrum to release the clamp from the bucket on the scale. In Fig. 13 the valve 39 is shown just at the end of its upward stroke admitting pressure to the piston-chamber 51 and about to drive the pistons 32 and 31 to the left. When the rocker-shaft rocks in the reverse direction, it carries valve 39 downward, compressed air is discharged from chamber 51 and admitted to chamber 50, forcing piston 31 forward. The two pistons 31 32, crossheads 17 33, and side rods 34 are all rigidly connected together and form what is hereinafter referred to as the "reciprocating frame."

The ring 5, as already stated, has an intermittent motion, being given at each cycle of operations a movement through an arc equal to that between two of the bucket-carriers. This may be accomplished in well-known ways, as by a pinion 52 engaging with teeth in the ring 5, the pinion being on an upright shaft, which passes through bearing 53 and is connected with the driving-shaft 54 by clutch 55 and miter-gears 217 and 220, inclosed in the box above the clutch. (See Fig. 2.) Each time the pinion 52 makes one revolution the ring 5 moves through the arc necessary to bring another bucket to the scale. Toward the end of each revolution of the pinion and of the clutch the lever 56 of the pawl which holds the two members of the clutch in engagement engages with a pivoted stop-lever 57 and turns the pawl back on its pivot and disengages the two members of the clutch, thereby bringing the pinion 52 and ring 5 to a rest. The clutch shown is described as follows: The lower member of the clutch 55 is fast to a shaft 216, (see Fig. 14,) and the shell 214 is loose on said shaft, but is fast to the hub 217 of bevel-gear 218. (See Figs. 1 and 14.) In the inner periphery of shell 214 are a series of scalloped recesses 219, (see Fig. 18,) adapted to be engaged by a cam 208 on the upper end of the short shaft 215 to lock the two members of the clutch together, and when so locked the shaft 216 will revolve and move the carrier-ring 5. A spring 212 tends to hold the cam 208 thus engaged. On the lower end of cam-shaft 215 is a dog or lever 56. When the reciprocating frame is in its rearward position and the hopper-valve is open, said dog 56 is engaged by a pivoted stop-lever 57 (see Fig. 14) in a manner to hold the cam-shaft 215 turned so that the cam 208 will not lock the two members of the clutch together, and therefore the shaft 216 will not turn and the carrier-ring will be at rest. A slide-rod 58, having upturned arm 180, engages with the pivoted stop-lever 57 by a boss 194 and groove, which allows turning of the rod 58 and normally retains the stop 57 by means of spring 60 in a position to engage the pawl-lever 56 at the proper time in the rotation, as above described. At each forward movement of the reciprocating frame a bar 59 on the side thereof engages with the arm 180 of the slide-rod 58 and causes it to slide forward, tipping up the stop-lever 57 on its pivot and disengaging it from pawl-lever 56, so that the lever 56 responds to the tension of the spring 212, which turns the cam 208 into engagement with the wall of one of the recesses 219 and locks the two members of the clutch together, again allowing the ring 5 to turn through another interval. As soon as the arm 180 is disengaged from bar 59 the coil-spring 60 throws slide-rod 58 again down into position to intercept pawl-lever 56 when it comes around.

A stop-pin 209 (see Fig. 18) extends into a notch in the cam 208 and limits the turning movements of the cam. In Figs. 18 and 19 there is shown a safety device additional to stop-lever 57 for holding the dog 56. This safety device is not shown in Fig. 14, it not being necessary for the operation of the machine, but is used for extra safety. It is described as follows: A plate-spring 206, fast at one end to the disk 55, bears at the other end on the vertically-slidable locking-pin 207, which, in addition to stop 57, prevents turning of dog 56. Projecting from said shaft 207 is a pin 211. When the stop-lever 57 turns upon its pivot, it will engage pin 211 and lift locking-pin 207 away from engagement with dog 56, and dog 56 will then be thrown by its spring 212 back under pin 207. When dog 206 is again engaged by stop-lever 57, the dog will be turned away from beneath pin 207, and spring 206 will throw pin 207 again down into locking engagement with dog 56.

As already stated, the piston-valve 39, which controls the admission of pressure to actuate the reciprocating frame, is actuated by the rocker-shaft 41 through crank 61 and connecting-rod 40. The mechanism for operating the rocker-shaft 41 will now be described. Said rocker-shaft is supported and has its bearings in hangers depending from the fixed ring 64, which is part of the frame of the machine. A torsion-spring 65 tends to rock the shaft 41 in a direction to pull down the connecting-rod 40 and piston-valve, which admits pressure to throw the reciprocating frame in a direction to close the hopper-valve. This tendency, however, is resisted by the engagement of the stop-lever 66, fixed to the rocker-shaft, with the head of the vertical tripping-lever 67, which is pivoted at 68 and whose lower end strikes against the end of the short arm of the horizontal tripping-lever 69. When the scale-beam 70 tips under weight of a load on the scale, the hook 71, depending from the scale-beam, engages the long arm of lever 69 and tips it up, thus dipping the rear short arm of said lever 69 and releasing the lower end of vertical lever 67, so that the rocker-shaft 41 under pressure of the torsion-spring 65 is allowed to turn, the stop-lever 66 riding down along the side of the head of vertical lever 67, turning lever 67 slightly on its pivot and throwing forward the lower end of said lever 67, so that it stands above the reduced rear portion of lever 69. A stop 72, which is engaged by the stop-lever 66, limits the downward rocking of the rocker-shaft 41, so that the throw of the piston-valve shall not be greater than is required.

The mechanism for rocking the shaft 41 in the reverse direction to lift the piston-valve and open the hopper-valve is actuated by the moving ring 5 and is thus described: A cam-lever 73 is pivoted to the fixed ring 64 and is so located that when the movable ring 5 rotates a projection from the ring 5 will ride over the cam-lever and cause it to turn down on its pivot. There should be one of these cam-actuating projections for each set of bucket-clamps arranged at equal intervals. For convenience the pins 74, which form part of the brackets which support the bucket-clamps, may serve the purpose of actuating the said cam-lever. The movable end of said cam-lever is connected by a link 75 with the lever 76, which is fast to the disk 77, which forms the driving member of a clutch on the rocker-shaft 41. (See Fig. 6.) Projecting from the side of disk 77 is a beveled tooth 78, which engages with a beveled notch 79 in the side of disk 80, which is keyed by feather 312 to rocker-shaft 41, so as to slide thereon, but not to rotate except with the rocker-shaft and forms the other member of the clutch. A spring 86 tends to lift said cam-lever and hold it up against the pin 74 and also to turn rocker-shaft 41 when the tooth 78 engages with notch 79. A yoke-lever 81, fulcrumed to the under side of the fixed ring 64, is connected with the sliding disk 80 of said clutch by pins 309, which project from arms 310 of said lever 81 into the groove 311 in the periphery of disk 80 and is also connected by link 82 with the lower end of the vertical lever 83, which is fulcrumed at 84 and extends upward into the path of the reciprocating frame, which opens the scale-hopper valve. A spring 85 normally holds the upright lever 83 in a position to keep the disk 80 near enough to disk 77 for the teeth to engage each other. When the scale-hopper valve is closed, the piston-valve being down, the beveled face of tooth 78 will be toward the beveled face of notch 79 and upright lever 67 will rest on top of the notched end of lever 69. When the ring 5 begins to revolve and the pin 74 rides on the inclined back of cam-lever 73, it will depress the cam-lever against the tension of its spring 86 and turn disk 77 backward, causing its tooth 78 to ride out of notch 79, as permitted by their beveled faces, pushing the disk 80 to one side, and turning upright lever 83 slightly on its pivot and against the pressure of its spring 85. From the top of the incline the cam-lever is made with a sloping portion, then a comparatively horizontal portion before it drops off at the end. After the ring 5 in its rotation has brought the pin 74 to the top of the incline and continues revolving the downward slope of the cam-lever will permit the cam to yield to the lifting action of the spring 86 until the pin 74 reaches the level portion of the lever, then while the pin rides over the level portion the cam-lever will remain at rest until the pin 74 rides off the end of the cam-lever, when the spring 86 will throw the cam-lever up the full remainder of its stroke. The rising of the cam-lever turns the disk 77 in the reverse direction, spring 85 throwing lever 83 back and sliding disk 80 so that tooth 78 will enter notch 79 and by its engagement with disk 80 causes the rocker-shaft 41 to turn in a direction to lift the connecting-rod 40 and move the piston-valve upward. The tension of spring 86 must be strong enough to overcome the torsion-spring 65, which tends to rock the shaft 41 to close the hopper-valve. The first period of rising causes the rocker-shaft 41 to turn slightly and partially lift the piston-valve, but not far enough to open the port. It turns far enough, however, to allow the pin 88, which projects from the rocker-shaft 41, to ride up along the curved head of the vertical lever 67 on the opposite side from that engaged by stop-lever 66 and to turn the lever 67 into position for its head to be engaged by stop-lever 66 and releasing its lower end from the upper side of horizontal lever 69. The forward arm of said lever 69 drops onto stop 190 and the rear arm tips up, as it will do on account of its being the lighter arm, and comes up in front of the lower end of lever 67, where it will prevent the lower end of lever 67 from moving forward again under pressure of the stop-lever 66 applied to the torsion-spring on the rocker-shaft until it is tripped by the tipping of the scale. During the time that the pin 74 is riding over the level portion of cam-lever 73 the lever 69, whose forward end has just dropped, has time to cease the vibration caused by the drop. When the pin 74 rides off the end of the cam-lever, the spring 86 throws it up to the end of its upward stroke, rotating rocker-shaft 41 still further and causing piston-valve 39 to move the remainder of its upward stroke far enough to shift the compressed-air pressure from the forward piston 31 to the rear piston 32 and throw the reciprocating frame backward to open the hopper-valve. An arm 87, projecting from cam-lever 73, strikes the under side of fixed ring 64 and limits the upward movement of the cam-lever after it rides off, although the stop-arm is not necessary. When the reciprocating frame moves rearwardly, it strikes the upright lever 83 and turns it on its fulcrum, thereby withdrawing disk 80 far enough from disk 77 to disengage tooth 78 from notch 79. The disks 77 80 being now out of engagement with each other, the pressure of spring 86 will not resist the torsion of spring 65. Said spring 65 will immediately turn rocker-shaft 41 far enough to cause stop-lever 66 to engage the curved side of the upper end of lever 67, and thereby bring the lower end of said lever 67 into a position to engage the rear end of horizontal lever 69; but such engagement prevents movement of the rocker-shaft far enough to shift the valves. When the scale tips and trips the lever 69 from front of the lever 67, arm 66 pushes the upper end of lever 67 out of the way, and the rocker-shaft 41 is free to complete its movement by spring 65 and pulls down the connecting-rod 40 and piston-valve, and the reciprocating frame moves forward and closes the scale-hopper valve. The spring 85 then turns lever 83 to throw sliding disk 80 back into close relation with disk 77, with the tooth 78 in notch 79. When the ring again moves, the operation will be repeated.

It is obvious that the form of clutch may be varied.

The rear end of a lever 90, fulcrumed at 91, is connected by a rod 92 with yoke 93, attached to the reciprocating frame, the forward end of said lever 90 extending under the forward arm of the scale-beam. When the reciprocating member moves forward to close the hopper-valve after the scale tips, it also causes the forward end of lever 90 to rise and throw up the scale again, and it holds the scale in that upward position, clamping it against the stop-arm 94, until the reciprocating frame moves rearwardly to open the hopper-valve, when the lever 90 drops away from contact with the scale-beam, leaving it free to dip under the weight of the load. The object of so locking the scale is to prevent vibration when the bucket is brought to the scale; but as the lever 90 is withdrawn at the instant the hopper-valve is opened, just as soon as the bucket reaches the scale there is still the possibility of a slight vibration and it is desirable to keep the scale locked for a brief period after the bucket reaches the scale. To accomplish this an auxiliary lock is provided, which will now be described.

An arm 95 is fixed to a rocker-shaft 96, which turns in bearings in a bracket attached to the frame of the machine. This arm 95 extends downward above the rear arm of the scale-beam, and the rocker-shaft 96 is actuated by suitable means to bring the arm 95 into a position above the scale-beam so as to lock the scale at some time before the hopper-valve opens and to allow it to remain in a locking position until after the main lock has been released, then to release the auxiliary lock, so that the scale can tip. The method shown for accomplishing this is as follows: Fixed to the forward end of the rocker-shaft 96 is a lever 97, which projects up into the path of the bracket-pins 74, which hold the bucket-clamps. The lever 97 is so adjusted that just after the ring 5 begins its rotary movement the bracket-pin 74, which is just moving away from the scale, will ride on the upper side of lever 97 and turn it down, thus turning rocker-shaft 96 in a direction to bring the locking-arm 95 into locking position above the scale-beam.

The means for releasing the auxiliary lock at the proper time is as follows: Depending from a rocker-shaft 100 is an arm 101, having at its lower end a hook 102, which is adapted to engage the locking-arm 95. There is also fixed to said rocker-shaft 100 a lever 103, which is connected by a link 98 with a crank-lever 104, pivoted to the bracket 105. Projecting from the crank-lever 104 is a boss 106, which is adapted to be engaged by the studs 107 and 108, projecting from the disk 109 at different periods in the rotation of said disk, the stud 107, which is nearer the periphery, being adapted to throw the crank-lever in a direction to cause the rocker-shaft 100 to turn so that the hook 102 on arm 101 will engage the locking-arm 95 and carry it away from the scale-beam, and the adjustment of the mechanism for rotating the disk 109 is such that this unlocking will occur just after the main locking-arm 90 has dropped. The continued rotation of disk 109 brings stud 108 into engagement with the boss 106 and turns the rocker-shaft 100 in the reverse direction and withdraws the lever 101 from engagement with the locking-arm 95.

The disk 109 is a two-part disk, the two parts being adjustable with relation to each other, so that the two studs 107 108, one of which is on each member of the disk, may also be adjusted relatively to each other and enabling regulation of the interval between the times when the two studs will engage with the boss 106. The inner member of the disk is clamped to the outer member by an eccentric-pin 113, which is turned by means of lever 114. By loosening the grip of the eccentric the inner disk can be turned so as to bring the two studs 107 108 into any desired relative position.

The disk 109 is mounted on shaft 110, which is connected by a clutch 111 with the shaft 112. Said clutch is similar to clutch 55. Mechanism is connected with said clutch in such a manner that the clutch is thrown into mesh just after the reciprocating member has moved rearward to open the hopper-valve, the shaft 110 and disk 109 then making one revolution while the hopper is feeding, and then the clutch becomes unshipped and the disk 109 and shaft 110 are brought to a rest. During the rotation the auxiliary locking-arm will be released from the scale-beam, as already described. This release can be made at any period during the rotation of the disk 109 that may be predetermined by the adjustment of the studs 107 108.

The mechanism by which the clutch 111 is unshipped will now be described. The two members of the clutch are locked together by a pawl and ratchet in a similar manner to clutch 55, the pawl having a finger 115, (shown in Fig. 15,) which is adapted to be engaged by a dog 116 at each revolution of the driven member of the cluch and of the shaft 110 to disengage the pawl from its ratchet and disengage the clutch, provided the dog is in the proper position for engagement with the pawl. The dog 116 on lever 117 is pivoted on bracket 118, which is attached to the frame of the machine. The lower end of lever 117 extends down into the path of a tripping-stud 120, fixed to the upper side of the cross-head 17 of the reciprocating frame. When the reciprocating frame moves rearwardly to open the hopper-valve, the tripping-stud 120 engages lever 117, turning it backward and disengaging dog 116 from the pawl-finger 115 by throwing the dog forward. When thus released, a spring (not shown) will throw the clutch-pawl into engagement with the clutch-ratchet, so that the shaft 110 will be rotated by the driving-shaft 54. Projecting from the periphery of the driven member of the clutch 111 is a pin 121, which during the rotation of shaft 110 will engage the side of dog 116 and turn the dog back on its pivot, so as to again bring it into position to engage pawl-finger 115 at the end of the revolution and trip the pawl and bring the driven shaft 110 to a rest, retaining it at a rest until the dog is again released by the rearward movement of the reciprocating frame which opens the scale-hopper valve.

The flow of goods through the first hopper 1 is controlled by mechanism operated by the driven shaft 110, so that the goods will not feed except while shaft 110 is rotating, and the flow may be during only a portion of such rotation, according to the adjustment of the mechanism.

For some kinds of goods instead of a worm-feed for hopper 1 a valve is preferred, which may be operated by a valve-rod 200, connected with the crank-lever 104, as shown in Fig. 20. When the stud 107 engages with the boss on crank-lever 104 to move it forward, it will open the hopper-valve, and when stud 108 engages the crank-lever to move it rearwardly it will close the hopper-valve. For other kinds of goods—such as fine goods, like cocoa—the preferred form of feed is the worm-feed, as illustrated in the drawings. The goods will feed only during the rotation of the worm, and the worm is given an intermittent rotation by operating it from the driven shaft 110. A hopper of this description is represented at 1, Figs. 7 and 8, provided with a feed-worm 131, driven by shaft 110 through sprocket 137 and suitable connections. The worm can turn only while the large sprocket 137 is turning, and the sprocket 137 can rotate only while the shaft 110 rotates. Attached to the worm-shaft within the hopper and above the worm is an agitator 196, which works in conjunction with the worm to furnish a uniform flow. The rotation of sprocket 137 can be still further limited to such fractional portion of the rotation of shaft 110 as desired. The following is one method of accomplishing this: The sprocket 137 is loose on shaft 110. Fixed to the side of sprocket 137 is a ratchet-wheel 138. Fast to shaft 110 is a disk 139, carrying a pawl 140, which is adapted to engage with ratchet 138. While the pawl and ratchet are engaged the sprocket 137 will revolve when the shaft 110 revolves. Said pawl 140 is mounted on a journal 141, which passes through disk 139. On the other end of said journal 141 is a dog 142. Pawl 140 has a rear projection 301, which is engaged by a spring-pressed pin 302, mounted in boss 303 on the side of disk 139 to retain the pawl 140 either in or out of engagement with the ratchet 138, as the case may be. When the pawl is out of engagement with the ratchet, the pin 302 engages with the notch 304 near the outer end of the rear projection 301 of the pawl, as shown in Fig. 17. When the pawl is in engagement with the ratchet, the pin 302 will engage with the depression 306 in said projection on the other side of the hump 305. Fixed rigidly to the frame is a disk 144, from which a pin 145 projects into the path of movement of the head of the dog 142. When the pawl 140 is in engagement with the ratchet and the sprocket 137 and disk 139 revolve far enough to bring the dog 142 around under the pin 145, the head of the dog will engage with the pin 145 and the dog will be turned on its pivot, thereby tripping the pawl out of engagement with the ratchet and causing the spring-pressed pin 302 to ride back over the hump 305, and then the pressure of the spring will push the pin 302 forward again into the notch 304, as shown in Fig. 17, thus retaining the pawl out of engagement with the ratchet until the pawl is again turned into engagement, as will be described hereinafter. When the pawl is disengaged from the ratchet, the sprocket 137 will cease to revolve and the feed through the first hopper will cease; but the disk 139, being fast to shaft 110, will continue to revolve until the shaft 110 is stopped at the end of its revolution. Projecting from disk 144 is another pin 143, which is nearer the axis of rotation than is pin 145, and this pin projects into the path of movement of the tail 307 of dog 142. When the disk 139 in its continued movement after disengagement of the pawl moves far enough for the dog to pass pin 143, the tail 307 of the dog will engage with the pin 143 and the pawl will be turned again on its pivot, throwing it again into engagement with the ratchet, and the spring-pressed pin 302 will ride in the reverse direction over the hump 305 and engage in the depression 306 to retain the pawl in engagement with the ratchet until again tripped by pin 145. The pin 145 can be varied in position by holes 500 in disk 144, so as to vary the length of time that the worm-feed will be in operation.

It is also desired that if through any wrong adjustment or accident the scale shall tip and close the scale-hopper valve before the first hopper has ceased to feed the ring shall not begin to move until after the feed from the first hopper shall cease. This might happen if the bucket when brought to the scale had already received through the first hopper a load which would tip the scale as soon as it reached the scale. In that case it would be desirable to have the machine automatically stopped until the defect could be remedied. This may be accomplished by the following means.

As already stated, the driven member of the clutch 55 is disengaged from the driving member at the end of each rotation by the stop-lever 57, which engages with the pawl-lever 56, and the stop-lever is disengaged from the pawl-lever by the bar 59 striking the arm 180 of the slide-rod 58, when the reciprocating frame moves forward to open the scale-hopper valve. If, however, the slide-rod 58 is not in a position to be engaged by the bar 59 when the reciprocating frame moves forward, although the hopper-valve will be closed, the carrier-ring will not be moved, and mechanism is provided so that the rod 58 will not be brought into position for such engagement unless the feed to the first valve has ceased before the scale tips. Means for doing this will now be described. Fixed to the forward end of the rod 58 is an arm 146, connected by a link 147 with a crank-arm 148, fixed to the rocker-shaft 100. The link 147 is formed with a slot 149, through which passes the pin 150, which connects the link with the crank-arm 148. Mounted on the shaft of pinion 52 is an eccentric disk 151. When the trip-arm 180 on rod 58 is in its turned-up position, where it is engaged by the bar 59 in the forward movement of the reciprocating frame, the arm 146 at the other end of the trip-arm shaft is in a position where it will be engaged by the eccentric disk 151 at some portion of the rotation of the pinion-shaft in moving the ring-carrier 5. The eccentric will rock the trip-rod shaft, as will be allowed by the slotted link 147, and the trip-rod arm 180 will be turned down out of the path of bar 59, the movement of the pin 150 in the slot permitting it, while lever 148 remains stationary. As soon as arm 180 has passed down away from bar 59 the spring 60 will throw the trip-rod rearwardly and bring stop-lever 57 down into position to engage pawl-lever 56 again at the end of the revolution of the pinion-shaft. The trip-arm 180 being now turned down out of the path of bar 59, it will not be engaged by the bar 59 at the next forward movement of the reciprocating frame unless in some way the trip-arm 180 be again turned up into its path, and if not so engaged then, although the scale-hopper valve is closed by such forward movement of the reciprocating frame, the carrier-ring cannot revolve, because the stop-lever 57 is not released from the pawl-lever 56. Should, however, the scale tip and the reciprocating frame move forward before the arm 180 is brought up into the path of pusher-bar 59, the arm 180 will be held beneath the bar 59 and prevented from turning, the slot 149 permitting the pin 150 to move while arm 180 is still beneath the bar 59, and therefore not moving arm 180. The trip-arm 180 will, however, in the normal working of the machine be turned up into the path of the bar 59 by means of the link 147 and crank 148 if the rocker-shaft 100 be rocked in a direction to turn the crank-arm upward. The rocker-shaft 100 is turned to accomplish this result by means of the stud 108 engaging with the boss 106 on the crank-lever 104 and which is so adjusted as to occur at the time the worm-feed in the first hopper is brought to a rest by the pawl 140 being tripped from ratchet 138 by pin 143. If the valve to the first hopper be a valve operated by connection with the crank-lever 104, as previously mentioned, the same turn of the shaft which closes the first-hopper valve will turn the trip-arm 180 up into the path of the bar 59.

As the buckets are intended to be used in continuous round, it is necessary to provide in some way for their discharge, and in order not to interrupt the operation of the machine means are provided which will discharge the loaded bucket some time after it has left the scale during an interval when one of the other buckets is receiving its final load. For convenience this place of discharge is placed at the rear of the machine; but it may be otherwise located.

The bucket-clamping fingers are formed with notches 151, which receive the angle-arms 152 on the side of the buckets 3. In order that the clamps may not have to bear the entire weight and as an additional safeguard, a track 157 is provided on which the bottom of the bucket slides. The bucket has a flap-bottom 153, hinged at the forward side by hinge 159 and normally kept closed by a spring-latch 154 at the rear. When the latch is tripped, the bottom will drop down on its hinge and allow the discharge of its contents. A device is provided for automatically opening the bottom and then closing it again, as will now be explained.

At the rear part of the machine or such other location as it is desired to have the place of discharge the track 157 is broken, and in the opening there is set a discharge-chute 155. Whether the place of discharge be at the rear or otherwise located it should be at a place where the discharge will occur during a period of rest by the carrier-ring. When the bucket is over the discharge-chute 155, the latch 154 will be tripped on the edge of the chute by a rod 156, allowing the bottom to drop on its hinge and the contents to be discharged. At the next movement of the carrier-ring the bottom of the bucket will be closed by the inclined portion 158 of the ring-track as it rides onto the track again.

It is preferable to have the track made with a decline as it approaches the discharge-chute and an incline where it leaves, but this is not necessary.

In order to more securely hold the buckets during the operation of opening and closing the discharge-valve, an overhanging plate 195, attached to the frame, engages the clamp-lever 13 just previous to the opening of the valve and prevents the clamp-fingers from being opened until after the bucket has passed out of range of the plate 195.

While the double-hopper machine is the preferred type, it is obvious that nearly all the features of the invention may be embodied in a single-hopper or single-feed machine in which the entire load is given to the receptacle while on the scale. It is also obvious that some features of the invention, such as the emptying of the buckets and some other features, are adapted for embodiment in a machine which fills packages by volume instead of weight, and as to features which are adapted for use in forms of packaging-machines which are not weighing-machines it is hereby intended that the claims shall include such other forms of machines.

What I claim is—

1. In combination with a weighing-machine, a carrier, a series of weighing-receptacles of uniform weight carried thereby, mechanism which actuates the carrier to carry the receptacles to and from the scale and back to the scale in successive order, and mechanism which discharges each loaded receptacle, substantially as described.

2. In combination with a weighing or packaging machine, two feed-supplies, a carrier which carries a series of receptacles, mechanism which actuates the carrier to place each receptacle in position to receive goods from each feed-supply in succession, mechanism which discharges the receptacle after it has received the required load, and mechanism which controls the feed, the transfer and the discharge so that simultaneously there will be receptacles receiving supplies from both feeds and a receptacle discharging, substantially as described.

3. In a weighing or packaging machine, a carrier having a series of holders carrying receptacles, mechanism for releasing the holders from the receptacles when on the scale, means for removing the receptacle from the scale, means for emptying the receptacle after removal from the scale, and means for clamping the receptacle to the holder before discharge, substantially as described.

4. In a weighing or packaging machine, a carrier having a series of receptacles, mechanism which actuates the carrier to bring each receptacle in succession to a position where it is loaded and which then removes it to a place of discharge, and returns it to a position to be again loaded, mechanism which discharges the contents of the receptacle and mechanism which positively secures the receptacle to the carrier during the discharge, substantially as described.

5. In a weighing or packaging machine, a carrier having a series of holders and valved receptacles carried thereby and removable therefrom, mechanism which actuates the carrier to bring the receptacles in succession to a position where they are loaded and which then removes them to a place of discharge and returns them to a position to be again loaded, mechanism which holds the discharge-valves closed, mechanism which unlatches the valves at the discharge-station, mechanism which closes the valves after the discharge, and supplemental mechanism which retains the receptacle in its holder while the valve is being closed, substantially as described.

6. In a weighing-machine, a carrier which carries a series of weighing-receptacles, a scale, mechanism which causes the carrier to place said receptacles in succession upon the scale and remove them when loaded and return them to the scale again, each of said receptacles being provided with a discharge-valve, mechanism for holding the discharge-valves closed, mechanism for releasing the valve-detent at the discharge-station, and mechanism for closing said valve before return of the receptacle to the scale, substantially as described.

7. In combination in a weighing-machine, a scale, a receptacle having a discharge-valve, mechanism for carrying the receptacle to the scale, and removing it from the scale when loaded, mechanism for holding the valve closed, mechanism for releasing the valve-detent after removal from the scale to discharge the contents, and mechanism for closing said valve before the receptacle is returned to the scale, substantially as described.

8. In combination with a weighing or packaging machine, a series of receptacles each having a valve in the bottom thereof, a track around said machine, mechanism for moving said receptacles around on said track so as to be successively filled, removed, emptied and carried to a position to be again filled, an opening in the track where the receptacle is emptied, a latch which holds the valve closed until the receptacle reaches the discharge-opening and a trip which unlatches the valve when the receptacle is above said opening, substantially as described.

9. In a weighing and packaging machine, a scale, a receptacle-carrier having a series of receptacle-holders each having a pair of pivoted clamps, mechanism which actuates the carrier to carry the receptacles to and from the scale, mechanism actuated by the moving carrier to open the feed-supply when the receptacle reaches the scale, and mechanism actuated by the feed-opening mechanism to release the clamps from the receptacle, substantially as described.

10. In a weighing and packaging machine, a scale, a receptacle-carrier having a series of receptacle-holders, each having a pair of pivoted clamps for the receptacle, mechanism actuated by the moving carrier to open the feed-supply when the receptacle reaches the scale, mechanism actuated by the feed-opening mechanism to release the clamps from the receptacle, mechanism actuated by the tipping of the scale to shut off the feed and start the carrier and disengage the clamp-releasing mechanism, and mechanism which causes the clamps to reëngage the receptacle, substantially as described.

11. In combination in a weighing-machine, a scale, a carrier, a series of weighing-receptacles of uniform weight carried thereby, mechanism which actuates the carrier to carry the receptacles to and from the scale and back to the scale in successive order, mechanism which when a receptacle is on the scale automatically supplies goods to the receptacle until it contains a predetermined weight, mechanism which then cuts off the supply of goods, and mechanism which automatically discharges each loaded receptacle before it is again carried to the scale, substantially as described.

12. In combination in a weighing-machine, a scale, a carrier having a series of clamps which hold weighing-receptacles, mechanism which moves the carrier so as to bring the weighing-receptacles in succession to the scale, away from the scale and back to the scale, mechanism which opens a feed-supply to the receptacle when on the scale and releases the hold of the clamps on the receptacle, mechanism which cuts off the supply and causes the clamps to again grip the receptacle when it contains a predetermined weight, mechanism which then starts the carrier, mechanism which holds the receptacle from discharging until it reaches a predetermined place and mechanism which releases the detent before it is again brought to the scale, substantially as described.

13. In combination with a weighing-machine, a carrier which carries a series of weighing-receptacles, mechanism which moves the carrier and brings the receptacles in repeated succession into position where they receive goods to a predetermined weight, and mechanism which discharges each loaded receptacle before it is again brought into position for loading, substantially as described.

14. A carrier which carries a series of receptacles of uniform weight, means for automatically feeding into each receptacle in repeated succession a predetermined weight of goods, means for moving the carrier after a receptacle has received its load so as to bring another receptacle into position for loading, a latch which holds said valve closed and a trip which releases the latch and permits discharge before the carrier again brings it into position for loading, substantially as described.

15. In a weighing-machine, a scale, a carrier which brings the receptacles to the scale, a feed shut-off which is actuated by the movement of the scales to shut off the supply of goods to the receptacle, a scale-lock which is applied by mechanism actuated by the moving carrier, mechanism which prevents said lock from releasing the scale until the feed is opened, and mechanism actuated by the opening of the feed to release the scale, substantially as described.

16. In a weighing-machine, a scale, a carrier which brings the receptacles to the scale, a feed shut-off which is actuated by the movement of the scale to shut off the supply of the goods to the receptacle, a primary scale-lock which is applied by the closing of the feed-shut-off mechanism and which is released by the opening of the feed, an auxiliary lock, and mechanism actuated by the opening of the feed to release said auxiliary lock after the primary lock is released and a receptacle is on the scale.

17. In a weighing-machine, a scale, a carrier which brings the receptacle to the scale, mechanism which locks the scale after the scale has tipped, feed opening and closing mechanism, and mechanism actuated by the opening of the feed which releases the lock from the scale at a predetermined interval after the feed is opened, substantially as described.

18. In a weighing-machine, a scale, a receptacle-carrier which places the receptacles on the scale, a scale-lock and mechanism actuated by the movement of the carrier to apply the lock to the scale, substantially as described.

19. In a weighing-machine, a scale, a carrier which brings the receptacles to the scale, a feed shut-off which is actuated by the movement of the scale, a scale-lock, mechanism actuated by the movement of the carrier to apply the said lock after the feed is shut off, mechanism actuated by the opening of the feed to release the lock at a predetermined period after the feed is opened, and means for varying the length of the interval between the opening of the feed and the releasing of the lock, substantially as described.

20. In a weighing-machine, a scale, a carrier which brings the receptacles to the scale, a reciprocating member which is actuated by the tipping of the scale to shut off the supply of goods to the receptacle on the scale, mechanism which is actuated by said reciprocating member when it shuts off the feed to return the scale to its normal position and lock it against tipping, said lock being released by the reverse movement of said reciprocating member when it opens the feed-supply, an auxiliary scale-lock which is applied by the moving carrier, mechanism which moves said reciprocating member in a direction to open the feed-supply when a receptacle is on the scale, and mechanism actuated by the opening movement of said reciprocating member to release said auxiliary scale-lock at an interval after the primary lock is released and a receptacle is on the scale, substantially as described.

21. In a packaging-machine, two feed-supplies one of which gives to the receptacle a portion of the required load and the other of which completes the load, mechanism which after the load is completed removes the loaded receptacle and carries the partially-filled receptacle to a position to receive a second supply, and mechanisms which prevent the carrier from moving until both feed-supplies are closed, substantially as described.

22. In a weighing-machine, a scale, two feed-supplies, one of which gives to a receptacle a portion of the required load, and the other of which completes the load when the receptacle is on the scale, mechanism which is actuated by the tipping of the scale to cut off the scale-feed and mechanism independent of the tipping of the scale which cuts off the preliminary feed, mechanism actuated by the joint action of the mechanism which cuts off the preliminary feed and of the tipping of the scale to move the carrier and remove the loaded receptacle from the scale and bring the partially-filled receptacle to the scale, the action of both cut-offs being necessary before the carrier can move, substantially as described.

23. In a weighing or packaging machine, a receptacle-carrier, a feed-supply, a shut-off for the feed, a rocker-shaft and intermediate mechanism actuated thereby whereby the feed is opened, a clutch on said shaft, a spring which tends to rock the shaft in a direction to open the feed when the two members of the clutch are in engagement and the spring is free to act, a pivoted cam-lever connected with one member of said clutch and with said spring, a projection on said carrier which engages said cam-lever and moves the clutch into position for engagement but prevents the rocker-shaft from turning sufficiently to open the feed while the carrier is moving, the detent being released so that the feed will be opened when the carrier stops, substantially as described.

24. In a weighing or packaging machine, a receptacle-carrier, a feed-supply, a reciprocating member actuated by fluid-pressure which opens and closes the feed, a source of fluid-pressure, a valve which controls the application of the power to the reciprocating member, a rocker-shaft and intermediate connections which operate said valve, a spring which is adapted to turn said rocker-shaft in a direction to cause the pressure to close the feed, a detent which prevents the shaft from being so turned until the scale tips, said detent being released by the tipping of the scale, substantially as described.

25. In a weighing or packaging machine, a scale, a receptacle-carrier, a feed-supply, a reciprocating member actuated by fluid-pressure which opens and closes the feed, a source of fluid-pressure, a valve which controls the application of the power to the reciprocating member, a rocker-shaft and intermediate connections which operate said valve, means which prevents the shaft from being so turned to close the feed until the scale tips, said detent being released by the movement of the scale after the receptacle is loaded, and intermediate mechanism actuated by the movement of the carrier which turns said rocker-shaft to actuate the feed-opening mechanism, substantially as described.

26. In a weighing-machine, a scale, a receptacle-carrier, a feed-supply, a shut-off for the feed, a rocker-shaft and intermediate mechanism actuated thereby whereby the feed is opened and closed, mechanism which is adapted to turn said rocker-shaft in a direction to close the feed when the scale tips, and intermediate mechanism actuated by the carrier which turns said rocker-shaft to open the feed, substantially as described.

27. In a weighing or packaging machine, a scale, two feed-supplies, mechanisms for opening and closing the feeds, mechanism which carries each receptacle to one of the feed-supplies where it receives a partial load and then to the scale-feed where it receives a further supply, a scale-lock and mechanism actuated by the closing of the preliminary feed to release the said scale-lock, substantially as described.

28. In a weighing or packaging machine, a scale, two feed-supplies, mechanisms for opening and closing the feeds, mechanism which carries each receptacle to one of the feed-supplies where it receives a partial load and then to the scale-feed where it receives a further supply, mechanism actuated by the movement of the scale to close the scale-feed, mechanism which closes the preliminary feed independent of the movement of the scale, mechanisms actuated by the closing of both feeds to permit movement of the carrier, the closing of the scale-feed being ineffectual to actuate the carrier except in coöperation with mechanism actuated by the closing of the preliminary feed, substantially as described.

29. In a weighing or packaging machine, a receptacle-carrier, a feed-supply, a shut-off for the feed, a rocker-shaft and intermediate mechanism actuated thereby whereby the feed is opened and closed, a spring which tends to rock the shaft in a direction to open the feed, a detent controlled by the carrier which prevents the said spring from turning the shaft sufficiently to open the feed while the carrier is moving, said detent being released when the carrier completes a period of movement, whereby the said spring is allowed to rock the shaft and actuate the feed-opening mechanism, substantially as described.

30. In a weighing or packaging machine, a receptacle-carrier, a feed-supply, a shut-off for the feed, a rocker-shaft and intermediate mechanism actuated thereby whereby the feed is opened and closed, a clutch and a spring which tend to rock the shaft in a direction to open the feed when the two members of the clutch are in engagement and the spring is free to act, a detent controlled by the carrier which prevents the said spring from turning the shaft sufficiently to open the feed while the carrier is moving, said detent being released when the carrier completes a period of movement, whereby the said spring is allowed to rock the shaft and actuate the feed-opening mechanism, substantially as described.

31. In a weighing or packaging machine, a receptacle-carrier, a feed-supply, a shut-off for the goods, mechanism which opens and closes the feed, a clutch combined with said opening and closing mechanism, a detent controlled by the carrier which prevents the feed from being opened while the carrier is in motion and which is released when the carrier completes its movement, and mechanism for engaging and disengaging said clutch, substantially as described.

32. In a weighing or packaging machine, a scale, a receptacle-carrier, a feed opening and closing mechanism, a member controlling the action of said feed-controlling mechanism, said member tending normally to actuate said feed-controlling mechanism to close the feed-supply, means operated by the carrier to move the said member into a position to open the feed, and a detent placed in operative position by the movement of the carrier to retain the said member in its last-mentioned position until released by the tipping of the scale, and which is released by the tipping of the scale, substantially as described.

33. In a weighing or packaging machine, a scale, a receptacle-carrier, a feed-supply, a reciprocating member which opens and closes the feed, a rocker-shaft and intermediate mechanism whereby said reciprocating member is actuated, a spring which tends to rock the shaft in a direction to close the feed, a clutch connected with said shaft and mechanism connected with said clutch of greater power than the feed-closing spring to rock the shaft in a direction to open the feed, mechanism actuated by the reciprocating member in opening the feed to disengage the clutch, a detent which prevents said rocker-shaft from being turned to close the feed until the scale tips, said detent being released by the tipping of the scale and the rocker-shaft then being turned to shut off the feed, substantially as described.

34. In a weighing or packaging machine, a scale, a receptacle-carrier, a feed-supply, a reciprocating member which opens and closes the feed, a rocker-shaft and intermediate mechanism whereby said reciprocating member is actuated, a spring which tends to rock the shaft in a direction to close the feed, a clutch connected with said shaft and mechanism connected with said clutch of greater power than said feed-closing spring to rock the shaft in a direction to open the feed, mechanism actuated by the reciprocating member in opening the feed to disengage the clutch, a detent which prevents said rocker-shaft from being turned to close the feed until the scale tips, said detent being released by the tipping of the scale, the rocker-shaft then being turned to shut off the feed, mechanism for reëngaging the clutch after the feed closes and means which prevent the feed-opening mechanism from becoming operative until after movement of the carrier, substantially as described.

35. In a weighing-machine, a scale, a receptacle-carrier, a feed-supply, a reciprocating member which opens and closes the feed, a rocker-shaft and intermediate mechanism whereby said reciprocating member is actuated, a lever pivoted to a support intermediate its two ends, one end of which is adapted to engage with a projection on the said rocker-shaft, a second lever pivoted to a support intermediate its two ends, one end of which is in a position to be tipped by the tipping of the scale and the other end of which engages one end of the first-mentioned lever and holds it in a position where it prevents the rocker-shaft from being turned to close the feed until the scale tips and which is tripped out of such engagement by the tipping of the scale, substantially as described.

36. In a weighing-machine, a scale, a feed-supply, mechanism which closes the feed, detent mechanism which prevents the feed-closing mechanism from closing until the scale tips, a pivoted lever which engages said detent mechanism and which is tripped by the tipping of the scale whereby the feed-closing mechanism becomes operative, substantially as described.

37. In a weighing-machine, a scale, a feed-supply, mechanism which closes the feed, detent mechanism which prevents the feed-closing mechanism from closing until the scale tips, a pivoted lever which engages said detent mechanism and which is tripped by the tipping of the scale whereby the feed-closing mechanism becomes operative, and mechanism which engages with said scale-tripped lever after the scale is tipped to check vibration of said lever, substantially as described.

38. In a weighing-machine, a scale, a feed-supply, mechanism which closes the feed, two pivoted levers which engage each other, one of which is tripped by the tipping of the scale, the other of which engages with the feed-closing mechanism whereby the feed is prevented from closing until the scale tips, said second lever engaging with the scale-tripped lever in another position after the scale is tipped and checking the vibration of said lever, and mechanism which restores the two levers to the first-described position of engagement after the feed is opened, substantially as described.

39. In a weighing-machine, a scale, a scale-feed, a receptacle-carrier, a reciprocating member which opens and closes the scale-feed, a rocker-shaft and intermediate mechanism whereby said reciprocating member is actuated, a torsion-spring which is adapted to turn said rocker-shaft in a direction to close the scale-feed, a detent which prevents the said shaft from being turned by said torsion-spring until the scale tips, a second spring one end of which is connected with a lever having a clutch connection with said shaft and which is adapted to turn the said shaft in a direction to open said scale-feed, a lever connected with the other end of said second spring which is engaged by a projection on the said carrier when the carrier moves and which prevents the said spring from turning the rocker-shaft enough to actuate the said reciprocating member to open the scale-feed during the movement of the carrier, mechanism which disengages the clutch after the scale-feed is opened, and mechanism which engages the clutch when the scale-feed closes, substantially as described.

40. In a weighing-machine, a scale, a scale-feed, an intermittently-moving carrier, a reciprocating member driven by fluid-pressure to open and close the scale-feed, a valve which controls the application of fluid-pressure to the reciprocating member, a rocker-shaft flexibly connected with said valve, a torsion-spring which is adapted to turn said shaft in a direction to cause the fluid-pressure to close the scale-feed, a detent which prevents said shaft from being so turned to close the scale-feed until the scale tips, a second spring one end of which has a clutch connection with said shaft, and which is adapted to turn said shaft in a direction to cause the fluid-pressure to open said scale-feed, a lever connected with the other end of said second spring which is engaged by said carrier when the carrier moves, and which prevents the said second spring from turning the rocker-shaft enough to actuate the reciprocating member to open the scale-feed during the movement of the carrier, mechanism which disengages the clutch after the scale-feed is opened and mechanism which engages the clutch when the scale-feed closes, substantially as described.

41. In a weighing or packaging machine, two hoppers or feed-chutes, mechanisms for closing both feeds, a rotary member connected with one of said feed-closing mechanisms whereby the said feed is closed after a predetermined period of time, and mechanism actuated by said rotary member which coöperates with the feed-closing mechanism of the second chute or hopper to close said second feed, said second feed-closing mechanism being operative only in coöperation with said rotary member, substantially as described.

42. In a weighing or packaging machine, two feed chutes or hoppers, mechanisms for controlling the feed therefrom, a scale, means for locking the scale, means whereby the scale is locked by the action of one feed-controlling mechanism, and means whereby the lock is released by the combined action of both feed-controlling mechanisms, substantially as described.

43. In a weighing or packaging machine, a scale, a receptacle-carrier, two feed chutes or hoppers, mechanisms for controlling the feed therefrom, means for actuating said carrier by the tipping of the scale, means for closing the feed from one chute by the tipping of the scale, and supplemental means whereby either or both of said feed-chutes may be closed without starting the carrier mechanism, substantially as described.

44. In a weighing-machine, a scale, a feed chute or hopper, a receptacle-carrier, time mechanism, and mechanism for moving said carrier actuated by the joint action of the movement of the scale and of the time mechanism, said carrier-moving mechanism being inoperative until after both a predetermined period of time has elapsed and a predetermined weight of goods has been fed, substantially as described.

45. In a weighing or packaging machine, a scale, two feed chutes or hoppers, a receptacle-carrier, a supply-controlling mechanism for each hopper, means whereby one of the feed chutes or hoppers is closed and the carrier started by the tipping of the scale, and means whereby said scale may tip and close said feed-chute without starting said carrier unless the other feed-chute has completed its supply to its receptacle, substantially as described.

46. In a weighing-machine, a feed-chute which partially supplies a receptacle with its required amount of material, a scale, a second feed-chute which completes the supply of the required amount to the partially-filled receptacle when it is on the scale, a receptacle-carrier, mechanism for actuating the carrier, mechanism actuated by the tipping of the scale and by auxiliary mechanism, said mechanism being actuated independent of the movement of the scale, both of which mechanisms must act before the carrier-moving mechanism can be operative, substantially as described.

47. In a weighing and packaging machine, a scale, two feed-supplies one of which gives to a receptacle a portion of the required load and the other of which completes the load when the receptacle is on the scale, a receptacle-carrier, a reciprocating member which controls the scale-feed, a driving-shaft, a shaft driven thereby which actuates the preliminary feed, a clutch connecting said two shafts, mechanism actuated by the movement of the reciprocating member in opening the scale-feed to connect the members of said clutch and thereby set in operation the preliminary feed, and trip mechanism which at the end of each rotation of said driven shaft disengages said clutch members, substantially as described.

48. In a weighing and packaging machine, a scale, a receptacle-carrier, feed mechanism, mechanisms for opening and closing the feed, a rocker-shaft carrying a scale-locking arm, mechanism actuated by the moving carrier to turn said rocker-shaft and move the said arm to lock the scale, mechanism actuated by the moving carrier to open the scale-feed, a driving-shaft, a driven shaft and a clutch connecting said shafts, mechanism actuated by the opening of the scale-feed to engage the clutch members and permit the driven shaft to be rotated, mechanism which disengages the clutch at the end of each rotation, a disk on said driven shaft, a second rocker-shaft and an arm carried thereby adapted to engage with said scale-locking arm to release the scale, projections on said disk, a crank on said second rocker-shaft and mechanism connected with said crank actuated by one of the projections on said disk to turn said second rocker-shaft in a direction to release the said scale-lock, substantially as described.

49. In a weighing and packaging machine, a scale, a scale-lock, mechanism which feeds goods to a receptacle on the scale, mechanism which controls the opening and closing of the feed, a driving-shaft, a shaft driven thereby and a clutch adapted to operatively connect said shafts, mechanism actuated by the opening of the scale-feed to engage the clutch members, mechanism which applies said lock to the scale, mechanism which disengages said clutch at the end of each rotation thereof, a lock-releasing member carried by said driven shaft, and mechanism actuated thereby which during the rotation of said shaft releases said lock from the scale, substantially as described.

50. In a weighing and packaging machine, a scale, two feed-supplies, one of which gives to a receptacle a portion of the required load and the other of which completes the load, when the receptacle is on the scale, a receptacle-carrier, a valve for the scale-feed, mechanism actuated by the moving carrier to open the scale-feed valve, a driving-shaft, a second shaft which controls the preliminary feed, and intermediate mechanism actuated by the opening of the scale-feed to connect said second shaft with said driving-shaft, mechanism which disconnects said driven shaft at the end of each rotation thereof, a scale-lock, mechanism actuated by the moving carrier to engage said lock with the scale and mechanism actuated by said driven shaft to disengage said scale-lock, substantially as described.

51. In a weighing and packaging machine, a scale, a scale-feed, mechanism which feeds to a receptacle on the scale, mechanism which controls the opening and closing of the feed, a driving-shaft, a shaft driven thereby and a clutch adapted to operatively connect said shafts, mechanism actuated by the opening of the scale-feed to engage the clutch members, a scale-lock, mechanism which applies said lock to the scale, mechanism which disengages said clutch at the end of each rotation thereof, and adjustable mechanism actuated by said driven shaft to disengage said lock from the scale at a predetermined time during the rotation of said driven shaft, substantially as described.

52. In a weighing and packaging machine, a scale, two feed-supplies one of which gives to a receptacle a portion of the required load and the other of which completes the load while the receptacle is on the scale, a receptacle-carrier, mechanisms which control the two feeds, a driving-shaft, a second shaft driven thereby and a clutch adapted to operatively connect said two shafts, the preliminary feed being controlled by said driven shaft, mechanism actuated by the opening of the scale-feed to cause said clutch to operatively connect said driving-shaft with said driven shaft and mechanism which disengages said clutch connection at the end of each rotation of the shaft, substantially as described.

53. In a weighing and packaging machine, a scale, two feed-supplies one of which gives to a receptacle a portion of the required load and the other of which completes the load while the receptacle is on the scale, the preliminary feed being a worm-feed, a receptacle-carrier, mechanisms which control the two feeds, a driving-shaft, a second shaft driven thereby and a clutch adapted to operatively connect said two shafts, mechanism connecting said worm-feed with said driven shaft whereby the worm-feed is controlled, mechanism actuated by the opening of the scale-feed to cause said clutch to operatively connect said driving-shaft with said driven shaft, and mechanism which disengages said clutch connection at the end of each rotation of the shaft, substantially as described.

54. In a weighing and packaging machine, a scale, two feed-supplies one of which gives to a receptacle a portion of its required load and the other of which completes the load while the receptacle is on the scale, the preliminary feed being a worm-feed, a receptacle-carrier, mechanisms which control the two feeds, a shaft, mechanism actuated by the opening of the scale-feed to rotate said shaft, mechanism which stops the rotation of said shaft at the end of each rotation, a second shaft having driving connections both with said first shaft and with said feed-worm, and mechanism which disengages the driving connection between said two shafts after a predetermined fraction of a rotation, substantially as described.

55. In a packaging-machine, feed mechanism, a rotatable shaft, mechanism for rotating said shaft intermittently, a second rotatable shaft which actuates said feed and having driving connection with said first shaft, and mechanism which disengages the driving connection between said shafts after a predetermined portion of a rotation, substantially as described.

56. In a packaging-machine, a rotatable shaft, mechanism for rotating said shaft and mechanism for stopping it at the end of each rotation, a second rotatable shaft and feed mechanism controlled thereby, a wheel loose on said first shaft, and having driving connection with said feed-shaft, a ratchet fixed to said loose wheel, a disk fast to said first shaft and carrying a pawl adapted to engage with said ratchet to cause the said loose wheel to be moved by said first shaft and thereby to actuate the feed-shaft and mechanism which trips the pawl and stops the feed after a predetermined fraction of a rotation of said first shaft, substantially as described.

57. In combination, a rotatable shaft, mechanism for rotating said shaft and mechanism for stopping it at the end of each rotation, a second rotatable shaft, a wheel loose on said first shaft and having driving connection with said second shaft, a ratchet fixed to said loose wheel, a disk fast to said first shaft, a pawl pivoted to said disk and adapted to engage with said ratchet to cause the said loose wheel to be moved by said first shaft, the pivot for said pawl passing through said disk and having a dog fixed thereto, a stationary disk through which said first shaft loosely passes, two pins projecting from the face of said stationary disk at different distances from the center and in different radii one of which pins engages said dog during the rotation of said first shaft and trips the pawl, the other pin throwing the pawl into engagement with the ratchet, substantially as described.

58. In a packaging-machine, a scale, two feed-chutes one of which applies to a receptacle a partial load and the other supplies it with an additional amount, mechanism for controlling the duration of feed from the first chute, mechanism controlled by the tipping of the scale to stop the feed from the second chute, a carrier for transferring the partially-filled receptacle to the scale, a clutch for actuating the receptacle-carrier, mechanism actuated by the first feed-chute-controlling mechanism in coöperation with mechanism controlled by the second feed-chute-controlling mechanism whereby the clutch is operated, substantially as described.

In testimony whereof I have affixed my signature in presence of two witnesses.

WILLIAM HENRY DOBLE.

Witnesses:
WILLIAM A. COPELAND,
ROBERT WALLACE.